UNITED STATES PATENT OFFICE.

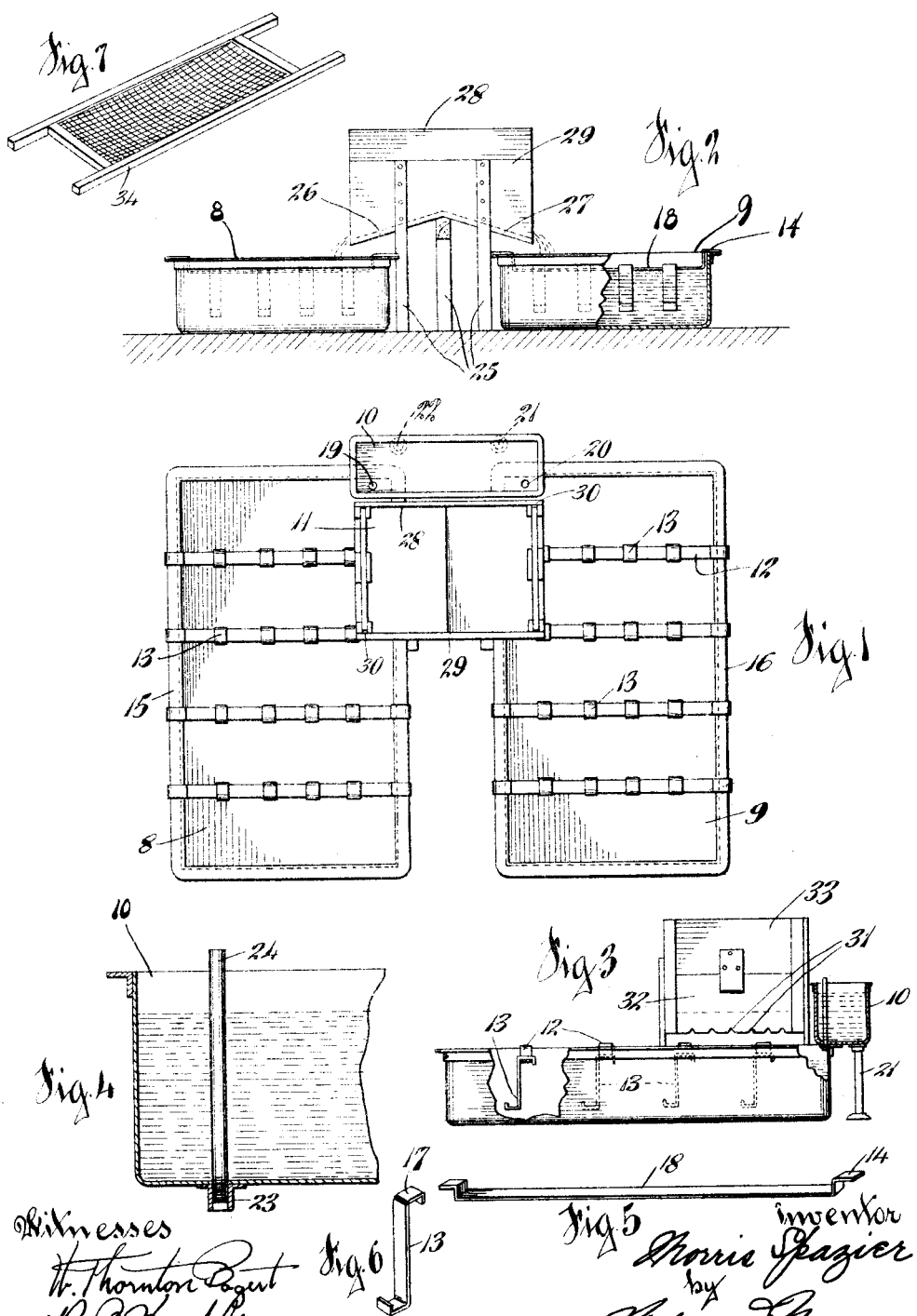
M. SPAZIER.
APPARATUS FOR THE MANUFACTURE OF SODIUM CARBONATE CRYSTALS.
APPLICATION FILED APR. 29, 1914.
1,127,691.
Patented Feb. 9, 1915.

MORRIS SPAZIER, OF CINCINNATI, OHIO.

APPARATUS FOR THE MANUFACTURE OF SODIUM-CARBONATE CRYSTALS.

1,127,691.  Specification of Letters Patent.  Patented Feb. 9, 1915.

Application filed April 29, 1914. Serial No. 835,104.

*To all whom it may concern:*

Be it known that I, MORRIS SPAZIER, a citizen of the United States of America, and resident of Cincinnati, county of Hamilton, and State of Ohio, have invented certain new and useful Improvements in Apparatus for the Manufacture of Sodium-Carbonate Crystals, of which the following is a specification.

This invention relates to improvements in apparatus for the manufacture of sodium carbonate and has for an object to produce an apparatus which is simpler and cheaper than other apparatus known to me.

A further object is to produce an apparatus which is capable of producing sodium carbonate more rapidly and in larger quantities than other apparatus known to me.

A further object is to produce an apparatus in which very little labor and no power is required in the production of the washing soda.

These and other objects are attained in the apparatus described in the following specification and illustrated in the accompanying drawings in which:—

Figure 1 is a plan view of the apparatus embodying my invention. Fig. 2 is a front elevation of the apparatus illustrated in Fig. 1 and showing a portion of the apparatus in section. Fig. 3 is an end elevation of the apparatus shown in Fig. 1 with a portion thereof broken away for clearness of illustration. Fig. 4 is a fragmental sectional view showing a detail of the apparatus embodying my invention. Figs. 5, 6 and 7 are perspective views illustrating details of the apparatus embodying my invention.

The apparatus consists of two tanks 8 and 9 which are placed adjacent to one another, a third tank 10 which is much smaller than the tanks 8 and 9 and which is located in such a position with relation to the tanks 8 and 9 that openings in tank 10 will communicate with either of the tanks 8 or 9, and a drain receptacle 11, which is located above tanks 8 and 9 and preferably in front of tank 10 as illustrated. Cross bars 12 having hangers 13, are placed transversely of tanks 8 and 9 so that the hangers depending therefrom will extend into the tank. The tanks 8 and 9 are shallow and are quite long and wide so that the exposed surface of the solution contained in each tank is relatively large in comparison to its volume. The cross bars 12 are provided at their ends with upwardly extending hooked portions 14, which extend over the flanges 15 and 16 extending around the periphery of the respective tanks 8 and 9, and the hangers 13 are provided with oppositely extending hooked portions 17 adapted to engage the transversely extending portions 18 of the cross bars. The hooked portions 17 are provided at each end of the hangers 13 in order that either end of the hangers may be placed on the cross bars. The tank 10 is preferably located at the back of the tanks 8 and 9, in such a position that a portion of the bottom of the tank extends over the interior of the tanks 8 and 9, in order that the openings 19 and 20 in tank 10, will communicate respectively with the tanks 8 and 9. Supports 21 and 22 are provided at the rear edge of tank 10. A simple and inexpensive means of closing the openings 19 and 20 in tank 10 is shown in Fig. 4. In alinement with these openings, flanged pipe couplings 23 are secured to the bottom of the tank as shown in Fig. 4, and a section of pipe 24, of a length greater than the depth of the tank, is screwed into each of the couplings, so that it extends to a point above the top of the tank and closes its respective openings, thereby preventing solution contained in the tank, from flowing out through the openings.

Located immediately in front of tank 10 is the drain receptacle 11, which is supported on the support members 25 so that the lowest point of the receptacle is above the tops of the tanks 8 and 9 as shown in Fig. 2. The bottom which constitutes the drain board of the receptacle, is made so that a portion 26 thereof, will discharge liquid into tank 8 and the other half 27, will discharge liquid into tank 9. The back 28 of the receptacle is preferably made somewhat higher than the front 29, so that material placed on the drain board will not fall into tank 10. The ends of the drain receptacle are removably mounted in slides 30 formed at each end of the front 29 and back 28. These ends are removable in order that the contents of the drain receptacle may be more easily removed and also to provide for cleaning it, and they are made so that they may be removed or replaced in sections. The reason for this construction is that the quantity of sodium carbonate removed from the tanks 8 and 9 may not be sufficient to entirely fill the receptacle when both sections of both ends are in position and therefore it may be necessary and desirable to use only the lower sections at a time. It will be seen in Fig. 3 that notches 31 are provided in the lower sections 32 of the end portions of the drain receptacle while the upper end portions 33 are not provided with notches. These notches are for the purpose of permitting excess solution to drain from the crystals of washing soda located on the drain board.

In use, a screen 34 shown in Fig. 7 is placed across the longitudinal edges of either one or the other of the tanks 8 or 9 and soda ash or dehydrated sodium carbonate is placed thereon and sifted so as to remove any foreign matter and to break up large lumps of the soda ash before it is placed in the tank. Sufficient water to form a saturated solution of the soda ash, is now poured into the tank and the mixture of water and soda ash is then agitated until the soda ash is completely dissolved and the solution is clear. The cross bars are now placed in position as shown in Fig. 1 and the hangers 13 are placed on the cross bars so that they are uniformly spaced thereon and extend into the solution. The tank is now left and the solution is allowed to remain undisturbed, for a certain time, until the crystals of washing soda have formed in the solution. In crystallizing, the crystals of washing soda start their formation about the hangers 13, these hangers forming a nucleus about which the system of crystallization will be established. The purpose of supplying a great number of hangers, is to provide a number of points around which crystallization may start, thereby hastening the process of crystallizing the mass of solution contained in the tank. The hangers preferably are evenly distributed in the tanks and at a distance apart such that they do not prevent the crystals falling to the bottom, when, in the process of crystallization, a sheet of crystals has formed, the weight thereof breaking it and allowing the crystals to fall to the bottom, ready for the formation of another sheet of crystals. In this manner, the formation and precipitation of crystals is carried on until a great proportion of the substance in solution has been converted in crystals. After one tank has been prepared, the other tank is prepared for the formation of washing soda, in a like manner. After the crystals have formed in the tank first prepared, the cross bars 12 and hangers 13 are removed and any solution which is not crystallized is bailed out of the tank and placed in tank 10, at the rear of the apparatus. The crystals of washing soda in the crystallizing tank 8 or 9, are now placed in the receptacle 11 and the excess or remaining solution in the crystalline mass is allowed to drain therefrom and to flow into each of the tanks 8 and 9. After the crystals have been removed from the first prepared tank and placed on the drain board, this tank may be again prepared for repeating the process. The washing soda after having drained sufficiently is now placed in barrels for shipment. By this time the washing soda in the second prepared tank is ready to be removed and the same procedure is carried out.

It will be seen that the operation of the apparatus is such that the manufacture of washing soda may be carried on continuously and that if a plant having a great number of such units as disclosed in this application, is placed in operation, the production may be carried on continuously and in large quantities, in a most inexpensive and simple manner.

The solution taken from the tanks 8 or 9, and which is placed in tank 10 previous to the removal of the washing soda to the drain board, may be allowed to flow into either one or the other of tanks 8 or 9 to be added to freshly prepared solution contained in either of these tanks. It will thus be seen that there is absolutely no waste of material in the production of washing soda when my apparatus is used, since not only the drainage liquor from the crystals located on the drain board is saved, but also the liquor or solution which has been removed from the crystallizing tanks.

By using an apparatus embodying my invention, the manufacturer of washing soda not only is saved expense in price of installation and also in labor, over previous apparatus but he can produce the product in larger quantities and more rapidly. In addition to this the producer is saved the necessity of employing steam, machinery and additional chemicals in the production of this product.

Having thus described my invention what I claim is:

1. An apparatus for producing washing soda, comprising two crystallizing tanks, a surplus solution tank located above and adapted to discharge into either one or the other of said crystallizing tanks, and a drain board located above and adapted to discharge into both of said crystallizing tanks.

2. In an apparatus of the character described the combination of a crystallizing tank, cross bars mounted in said crystallizing tank, and hangers on said cross bars adapted to extend into the solution contained in said tank to form a nucleus around which the formation of crystals will take place.

3. In an apparatus of the character described, the combination of a crystallizing tank, supports for hangers, means for mounting the supports over the tank, the hangers on said supports adapted to extend into the solution contained in the tank to form nuclei around which the formation of crystals will take place.

4. An apparatus for producing sodium carbonate crystals, comprising two crystallizing tanks located side by side with a space between them adequate to permit access to a drain board, and the drain board located above said space and having a bottom which has a central raised portion and side portions descending therefrom and extending over the adjacent tanks and adapted to discharge the drainage into the tanks.

In testimony whereof, I have hereunto subscribed my name this 25th day of April, 1914.

MORRIS SPAZIER.

Witnesses:
  WALTER F. MURRAY,
  H. THORNTON BOGERT.